March 20, 1973     L. HOLMAN ET AL     3,721,460

JET ENGINE TO AIR INLET DUCT FLEXIBLE JOINT AIRCRAFT

Filed Dec. 17, 1970

INVENTOR.
LEONARD HOLMAN
RICHARD H. TIMMS

BY *Henry E. Pearson*

ATTORNEY

United States Patent Office 3,721,460
Patented Mar. 20, 1973

3,721,460
JET ENGINE TO AIR INLET DUCT FLEXIBLE
JOINT AIRCRAFT
Leonard Holman, Imperial Beach, and Richard H. Timms,
San Diego, Calif., assignors to Rohr Corporation, Chula
Vista, Calif.
Filed Dec. 17, 1970, Ser. No. 99,062
Int. Cl. F16l 55/00
U.S. Cl. 285—175                                6 Claims

ABSTRACT OF THE DISCLOSURE

A flexible, sealed joint for connecting an air inlet duct to a jet engine of a high performance aircraft comprises an adapter ring having a flat forward face secured co-axially, and in conforming relation, onto the forward end of the engine casing. Spring clips urge the flat face of the adapted ring into conforming engagement with the flat rear face of a seal ring mounted in sealed relation, and for limited adjustment, on the aft end of the engine air inlet duct. An external flange near the aft end of the air inlet duct limits forward displacement of the seal rings, and thereby the engine, in the event of engine mount failure, while spring fingers limit axial separation of the seal ring and air inlet duct. A double thickness sleeve of flexible, springy, sheet metal is slitted transversely in its aft portion into relatively overlapping spring fingers, and is fitted into, and fastened at its forward end to the air inlet duct. The spring fingers are biased outwardly at their rear ends and extend past the seal ring and fit flush into the adapter ring to maintain a smooth air flow surface from the inlet duct into the engine casing, even when the latter two are displaced from their normal, designed co-axial condition, and resiliently urge the inlet duct and engine casing toward axially aligned condition.

BACKGROUND OF THE INVENTION

In some jet engine propelled aircraft, particularly high performance aircraft, in addition to the usual stresses exerted by the operation of the engine and its axial growth upon changes of temperature, substantial stresses are exerted on the airframe in the event of unusual takeoffs and landings and in the execution of maneuvers which generate high gravitational stresses. The engines of such aircraft have their principal mounting connection to the air frame at the aft portion of the engine, and if the air duct for the engine is rigidly connected to the engine, these stresses may be transmitted to the air inlet duct, which is undesirable. In the past, efforts have been made to provide a flexible duct joint between the engine casing and air inlet duct, such as by providing an elastomeric band, and convoluted metal diaphragms, but such prior developments have presented problems due to the shear stresses and temperatures involved, and the requirement of maximum streamlining of the air inlet duck-to-engine surfaces.

SUMMARY OF THE INVENTION

A primary objective of the present invention is to provide a smoothly streamlined, flexible, sealed joint between the forward end of a jet aircraft engine and the aft end of its air inlet duct which permits limited lateral deflection and axial movement of the forward end of the engine casing relative to the inlet duct, while at the same time sealing the engine casing to the duct and resiliently urging the casing and duct back toward co-axial condition after deflection. The invention also limits forward displacement of the engine in the event of failure of the engine mounting structure.

A further objective is to provide a slightly flexible, sealed joint between an aircraft jet engine and its air inlet duct by biasing a smooth, planar face on the forward end of the engine casing into contact with a generally similar face on the rear end of a seal ring which is mounted for sealed, limited axial and tilting adjustment on the aft end of the air inlet duct. An aligning sleeve having overlapping spring sheet metal fingers is flush-fitted coaxially into the aft end of the air duct, and the spring fingers are biased outwardly at their rear ends and extend flush into the adapter ring, providing a smooth flow surface from the air inlet duct into the engine casing even when the latter two are displaced from coaxial condition. The sleeve lightly biases the engine casing and air inlet duct toward co-axial condition. Stop means on the air inlet duct limits forward displacement of the engine in the event of engine mount failure.

BRIEF DESCRIPTION OF THE DRAWINGS

The foregoing objectives and advantages of the invention will be apparent from the following description and the accompanying drawings wherein.

DETAILED DESCRIPTION OF THE DRAWINGS

Figure 1:
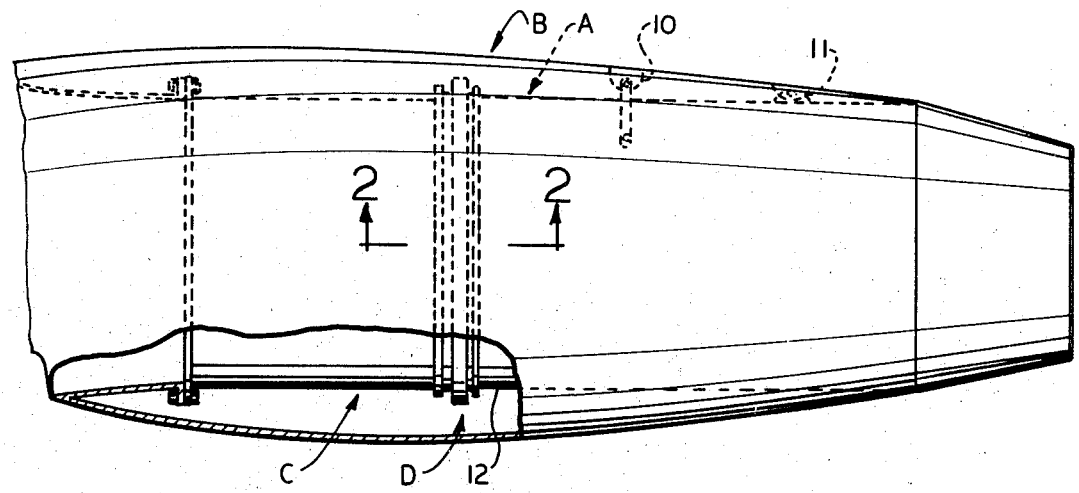
FIG. 1 is a diagrammatic, side elevational view of an aircraft jet engine mounted in an airframe structure, a portion of the latter being broken away.

Referring to the drawings in detail, an aircraft jet engine A, which can be of any suitable type, is mounted in a usual airframe structure B. The engine A is supported to the airframe structure B in a well known manner such as by conventional engine mounts 10 and 11, FIG. 1. The engine A is connected to its air inlet duct C by a flexible joint D embodying the present invention.

The engine A comprises a usual, generally tubular engine casing 12, which may be of any suitable or conventional type for the particular jet engine employed. The forward end of the illustrative engine casing 12 has the cross sectional configuration shown in FIG. 2.

Fitted co-axially, and in conforming, sealed relation onto the forward end of the engine casing 12 is an adapter ring 13, the interior of which converges forwardly slightly in the illustrative example to provide for a smooth flow of inlet air into the engine from the usual engine air inlet duct, which is of slightly smaller internal diameter than the engine casing 12. The adapter ring 13 is secured firmly to the engine casing 12 by suitable means, such as a well known clamp ring 14 of V cross sectional shape which may be of the type sold under the trade style of V band clamp.

A thin, wide, radial flange 15 is provided on the forward end of the adapter ring 13, and may be either welded onto, or machined integrally with, the remainder of the adapter ring. At present the latter procedure is preferred. In any event the forward face 17 of the adapter ring 13 is flat, and refines a plane normal to the common axis of the ring 13 and the engine casing 12. In effect, the forward face of the adapter ring is the forward face of the engine casing.

A plurality of spring clips 18 of generally Z cross sectional shape, each preferably of the order of several inches in circumferential extent, are secured by fasteners 19 to the adapter ring flange 15. These clips overlie and engage a flange 20 provided intermediately of the axial length of, and integral with, a seal ring 21 to resiliently bias the seal ring axially toward the adapter ring 13. These spring clips 18 allow limited lateral displacement between the adapter ring 13 and seal ring 21, while maintaining the adjacent faces thereof in sealing contact with each other throughout their entire circumferential extent.

Figure 2:
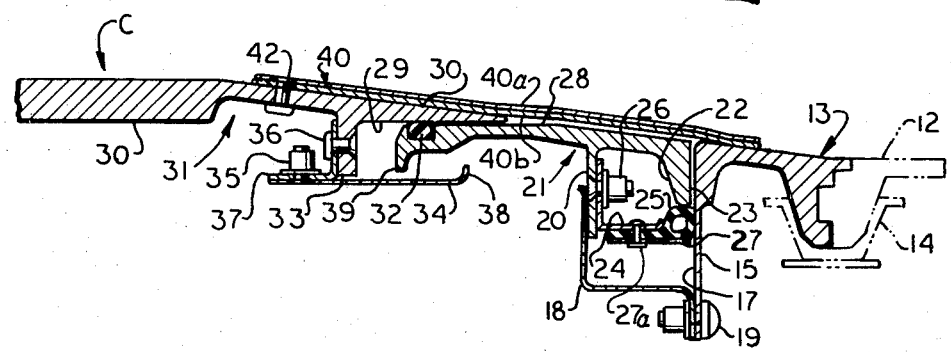
FIG. 2 is an enlarged, fragmentary, sectional view taken along line 2—2 of FIG. 1 through the flexible joint embodying the present invention, the external airframe structure being omitted.

The aft end of the seal ring 21 is of the substantially same internal diameter as the forward end of the adapter ring 13, and has a radial flange 22 around the aft end thereof. The aft face 23 of the seal ring flange 22, which is also the aft end of the seal ring itself, is flat, like the forward face 17 of the adapter ring 13, and defines a plane normal to the axis of the seal ring 21. This aft face 23 of the seal ring is fitted substantially coaxially to, and internally co-extensively with, the forward face 17 of the adapter ring flange 15, and is resiliently biased into contact therewith by the spring clips 18 as shown in FIG. 2.

An annular seal support member 24 of right angle cross sectional shape is mounted by fasteners 26 substantially co-axially on the aft side of the seal ring intermediate flange 20, and a resilient seal 25 of suitable elastomeric material is mounted on this support member 24 and is secured thereon by an encircling metal seal retainer 27 and rivets 27a. The seal 25 bears against the flat forward face 17 of the adapter ring 13 to seal the joint between the adapter ring and the seal ring 21.

The interior surface 28 of the forward portion of the seal ring 21 is substantially cylindrical, and fits co-axially, for axial slidable adjustment, onto an externally cylindrical surface 29 on the inlet air duct C. Sufficient clearance is provided between the cylindrical seal ring surface 28 and the outer cylindrical surface 29 on the inlet duct to permit such slight relative tilting movement therebetween as may be required for adjustment, as will be apparent later herein.

The illustrative air inlet duct C comprises a usual cylindrical body portion 30, secured at its forward end to the air frame structure B, and rear portion 31. The inner surface 30 of the rear portion 31 of the air inlet duct C diverges rearwardly by an angular amount corresponding to the forward convergence of the aft portion of the seal ring 21 and the adapter ring 13, so that when the parts are assembled and in their normal, axially aligned position as shown in FIG. 2, there is a smooth divergence aft from the inlet duct C to the engine casing 12.

An O-ring seal 32 is fitted into an inwardly opening groove provided in the forward end portion of the seal ring cylindrical inner surface 28, and this O-ring has sealing engagement with the cylindrical outer surface 29 of the air inlet duct rear portion 31.

A stop flange 33 is provided externally around the air inlet duct at the forward end of the cylindrical surface 30 to limit forward movement of the seal ring 21, and thereby of the engine A, in the event of failure of the engine mounts 10 and 11. The stop flange 33 is located far enough forward to provide for axial growth and movement of the engine within normal operational limits.

A plurility of restraining clips 34 are secured by fasteners 35 on angle supports 37, mounted by rivets 36 at selected spaced circumferential intervals on the stop flange 33. Inwardly bent rear end portions 38 of these clips are designed and positioned to engage a radially extending lip 39 formed on the forward end of the seal ring 21 to restrain the air duct A and the seal ring 21 against axial separation.

Figure 3:
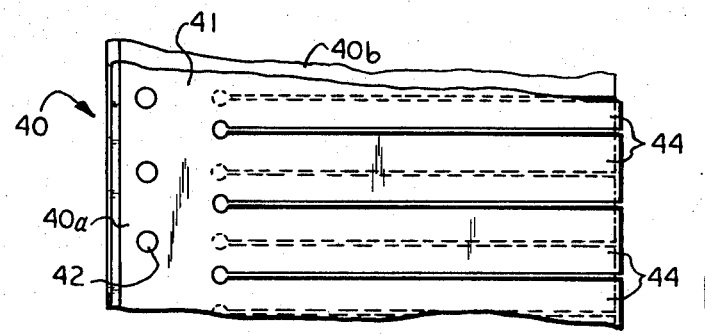
FIG. 3 is a fragmentary, plan view showing a developed portion of the double thickness, overlapping spring finger sleeve shown in section in FIG. 2.

A sleeve 40 of suitable spring sheet metal, preferably of a double thickness comprises two layers 40a and 40b, see FIGS. 2 and 3, which are substantialy similar. Each layer comprises an unslitted forward portion 41 which fits smoothly into the rear air duct portion 31 and is secured thereto by countersunk head rivets 42, and an aft portion which is divided by slits, see FIGS. 2 and 3, into a plurality of spring fingers 44 in the nature of leaf springs, which are biased outwardly at their rear ends to retain contact with the adapter ring even when the air inlet duct and engine casing are relatively displaced to non-coaxial conditions within the design limits of the joint D. The slits of the two layers 40a and 40b are circumferentially offset from each other, as shown in FIG. 3, so that the fingers of one set seal the slits in the other and thus prevent whistling which otherwise might be caused by inlet air moving past the slits. The entire sleeve 40, including the spring fingers 44, is formed to fit into, and conform smoothly to, the rearwardly diverging internal surfaces of the air duct rear portion 31, seal ring rear portion, and adapter ring 13 as shown in FIG. 2 so as to provide a smooth, uninterrupted flow surface therebetween, even when the engine casing and air duct are slightly out of axial alignment. The amount of lateral shifting permitted between engine casing and air inlet duct without disturbing the rear ends of the spring fingers 44 will depend upon the clearance provided between the spring fingers and the seal ring 21. A single thickness sleeve, similar to the one 40a, would be satisfactory in most instances since the contacting flat faces of the adapter ring and seal ring, plus the seal 25, will normally provide a satisfactory seal. However, the double thickness sleeve 40 as illustrated is presently preferred.

OPERATION

When an aircraft executes a maneuver which places high G stresses on the airframe B, or other conditions exist which tend to move the forward end of the engine A out of axial alignment with its air inlet duct B, the spring clips 18 permit limited lateral slippage to occur between the spring biased, co-planar annular faces 17 and 23. Upon relief from such stresses or conditions, the airframe and engine tend to return to their normal, designed, co-axial condition, the spring fingers lightly assisting each return. Axial growth of the engine is permitted by limited telescopic movement between the inlet duct and the seal ring as explained previously herein.

In the event of failure of the engine mounts 10 and 11 while the engine A is operating, the powerful thrust of the engine tends to drive it forward, but the seal ring 21 encounters the flange 33 on the air inlet duct C and is arrested against further forward displacement. The seal ring, being in direct thrust engagement with the adapter ring 13 and engine casing 12 thus prevents further forward displacement of the engine.

The angle clips 34 tend to restrain the seal ring 21 against extreme rearward displacement, but such displacement would not be apt to occur except during handling, shipping, or installing of the adapter ring and seal ring.

The invention provides a simple and effective, self aligning, sealed, flexible, failsafe joint structure for connecting a jet engine to its air inlet duct in a high performance aircraft.

Having thus described my invention, what I claim as new and useful and desire to secure by U.S. Letters Patent is:

1. A flexible joint structure for connecting the casing of an aircraft jet engine co-axially to its air inlet duct, comprising means forming an annular face normal to the axis of the engine casing on the forward end of the engine casing, a seal ring fitted co-axially in internally conforming relation to the forward end of the engine casing, an annular face normal to the axis of the seal ring on the aft end of the seal ring shaped to fit in contacting, sealed relation to the forward face on the engine casing throughout the entire circumferential extent of both faces, said faces being formed for limited relative slippage transversely to the axis of the engine casing while remaining in such contacting, sealed relation, means biasing the engine casing and seal ring axially toward each other to retain said faces in such contacting, sealed engagement with each other, means mounting the seal ring in internally conforming relation for limited tilting adjustment, and in sealed relation, on the aft portion of the air inlet duct, and a sleeve of springy material fitted at its forward end into, and secured to, the aft end of the air inlet duct, said sleeve extending in fitted, conforming radially outwardly biased, axially slidable relation into an element of the engine casing.

2. A joint structure as claimed in claim 1 wherein the sleeve is slitted forwardly from its aft edge part way through by a plurality of slits, thereby dividing the aft portion of the sleeve into a plurality of fingers in the nature of leaf springs.

3. A joint structure as claimed in claim 1 wherein the means forming said annular face includes an adapter ring having a face of substantially greater external diameter than that on the seal ring, and the face on the adapter ring face includes the forward face of a flange integral with, and extending radially around the forward end of, the adapter ring.

4. A joint structure as claimed in claim 1 wherein the means biasing the engine casing and seal ring toward each other comprises a plurality of spring clips operatively connected between the seal ring and the engine, each spring clip being fixedly anchored at one end thereof to one of said biased members, and bearing for limited, spring biased movement at the other end thereof on the other of said biased members.

5. A flexible joint structure for connecting the casing of an aircraft jet engine co-axially to its air inlet duct, comprising an adapter ring fitted and secured co-axially, in internally conforming, sealed relation to the forward end of the engine casing, said adapter ring having a flat forward face defining a plane normal to the adapter ring axis, a seal ring having a flat aft face defining a plane normal to the axis of the seal ring, said flat seal ring face being formed to fit substantially co-axially, and in internally, substantially conforming, contacting relation, to the flat forward face of the adapter ring, spring means biasing the adapter ring and seal ring axially toward each other to retain the flat faces of both rings in sealing engagement with each other throughout their respective circumferences, means mounting the seal ring for limited axial and relative tilting movement on the aft portion of the air inlet duct, seal means operatively interposed between the seal ring and air inlet duct and sealing the seal ring substantially co-axially to the aft portion of the air inlet duct, and means for resiliently urging the air duct and the adapter ring toward a return to co-axial condition in the event of lateral slippage to non-co-axial condition of the contacting faces of the adapter and seal rings.

6. A joint structure as claimed in claim 5 wherein a flange of substantial radial extend is provided around the forward end of the adapter ring, and the flat forward face of the adapter ring includes the forward face of said adapter ring flange, a flange of lesser radial extent is provided around the aft end of the seal ring, the spring means comprises a plurality of spring clips, fixedly secured at circumferentially spaced intervals to the outer portion of the adapter ring flange, and in spring pressed, biasing engagement with said seal ring flange, the spring clips being spaced outwardly from the flange on the seal ring to limit lateral slippage between the contacting faces of the adapter and seal rings.

References Cited
UNITED STATES PATENTS

| | | | |
|---|---|---|---|
| 2,656,201 | 10/1953 | Swerdlow et al. | 285—224 X |
| 2,646,294 | 7/1953 | Anderson | 285—165 |
| 2,674,844 | 4/1954 | Boyd et al. | 60—39.32 X |
| 2,711,074 | 6/1955 | Howard | 60—34.31 X |

FOREIGN PATENTS

| | | | |
|---|---|---|---|
| 319,835 | 4/1957 | Switzerland | 60—39.31 |
| 1,170,953 | 11/1969 | Great Britain | 285—224 |

DAVE W. AROLA, Primary Examiner

U.S. Cl. X.R.

60—39.32; 285—224, 302